(12) United States Patent
Wang

(10) Patent No.: US 7,298,362 B2
(45) Date of Patent: Nov. 20, 2007

(54) POINTING DEVICE WITH FINGER-CONTACT CONTROL

(75) Inventor: Yu-Qi Wang, Taipei (TW)

(73) Assignee: Kye Systems Corp., Taipei (TW)

( * ) Notice: Subject to any disclaimer, the term of this patent is extended or adjusted under 35 U.S.C. 154(b) by 425 days.

(21) Appl. No.: 10/630,696

(22) Filed: Jul. 31, 2003

(65) Prior Publication Data
US 2005/0024335 A1   Feb. 3, 2005

(51) Int. Cl.
*G09G 5/08* (2006.01)

(52) U.S. Cl. .............. 345/166; 345/156; 345/157; 345/161; 345/164

(58) Field of Classification Search .......... 345/166, 345/156–157, 161, 163, 164; 382/126
See application file for complete search history.

(56) References Cited

U.S. PATENT DOCUMENTS

| | | | |
|---|---|---|---|
| 5,530,455 A | 6/1996 | Gillick | 345/163 |
| 5,578,817 A | 11/1996 | Bidiville et al. | 250/221 |
| 5,623,553 A | 4/1997 | Sekiya | 382/127 |
| 5,801,681 A * | 9/1998 | Sayag | 345/157 |
| 6,449,858 B1 * | 9/2002 | Reay et al. | 33/366.12 |
| 6,552,713 B1 * | 4/2003 | Van Brocklin et al. | 345/157 |
| 6,917,695 B2 * | 7/2005 | Teng et al. | 382/126 |
| 6,977,645 B2 * | 12/2005 | Brosnan | 345/166 |
| 2003/0098852 A1 * | 5/2003 | Huang et al. | 345/166 |
| 2005/0180619 A1 * | 8/2005 | McClurg et al. | 382/124 |

* cited by examiner

*Primary Examiner*—Richard Hjerpe
*Assistant Examiner*—Leonid Shapiro
(74) *Attorney, Agent, or Firm*—Bacon & Thomas, PLLC

(57) ABSTRACT

A pointing device includes a first convex lens on a housing of the pointing device and arranged such that when a user's finger slides over the lens, an image of the user's finger is sensed to generate a cursor-moving or scrolling signal for a computer.

7 Claims, 3 Drawing Sheets

POINTING DEVICE WITH FINGER-CONTACT CONTROL

BACKGROUND OF THE INVENTION

1. Field of the Invention

The present invention relates to a pointing device, and in particular, to a pointing device utilizing a finger-contact device to control a cursor movement on a computer display.

2. Description of the Prior Art

The term pointing device generally means a device that can input a cursor movement signal to a computer system, notebook computer (NB), or personal digital assistant (PDA) so as to execute a corresponding command. Examples of pointing devices include a computer mouse, trackball, touch pad, tablet, and joystick . . . etc. However, due to its convenience for a user's hand, the mouse is still supposed to be the most popular pointing device.

A computer mouse has two main types of sensing mechanism—a ball type (mechanical type) and an optical type. The ball type mouse uses a ball located thereunder for moving over a working surface, and a pair of shafts constantly in contact with the ball. The rotation of each shaft in response to ball movement causes generation of a corresponding cursor-moving signal and transmission of the cursor-moving signal to a computer system. The optical mouse, on the other hand, receives light reflected from a working surface to detect variations in an image position while moving over a working surface so as to generate a corresponding cursor-moving signal.

Still, either the ball type or the optical type computer mouse needs a large enough space to move over a working surface, which causes inconvenience if the space is limited. To solve this problem, a trackball has a ball which eliminates the need for a working surface. The user merely needs to use his finger to rotate the ball in order to generate a corresponding cursor movement signal. For example, U.S. Pat. No. 5,578,817 discloses a trackball device, in which the ball has been carefully designed with speckles, light spots, grids, or micro-texture, etc., to facilitate detection of ball rotation. However, this type of trackball has a high production cost.

In order to solve the problem of cost, another embodiment illustrated in FIG. 22 of U.S. Pat. No. 5,578,817 replaces the trackball with a fingerprint image detector. Furthermore, U.S. Pat. No. 5,623,553 also discloses a fingerprint image detector. Both of the cited references use a similar design including a light, a prism, a lens and a sensor, in which a light beam is projected onto a finger placed on the prism, and the fingerprint is reflected to the sensor so as to generate a cursor-moving signal. However, the cost of a prism is relatively high, and detection of the fingerprint has to be controlled quite precisely.

In addition, U.S. Pat. No. 5,801,681 discloses a method and apparatus for generating a control signal, where a light can project a light beam onto a platen such that a sensor can retrieve an image position according to the movement of a finger. However, when the finger is away from the platen but still in a very close position, the sensor can possibly retrieve a wrong image position and generate a wrong cursor-moving signal. Also, ambient light must be taken into account, and therefore the position of the sensor shown in FIGS. 2 and 5 of U.S. Pat. No. 5,801,681 to avoid sensing diffused or reflected light from beyond a critical angle, which is determined according to the material of the platen.

SUMMARY OF THE INVENTION

It is an object of the present invention to provide a pointing device that can effectively control the cursor moving on the display in a very limited working surface.

It is another object of the present invention to provide a pointing device that prevents dirt or dust from contaminating the cursor sensing mechanism within the pointing device.

In order to accomplish the objects of the present invention, the present invention provides a first convex lens upon the body of the pointing device, in which a user's finger can slide over the lens to generate a cursor-moving signal for transmission to a computer.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
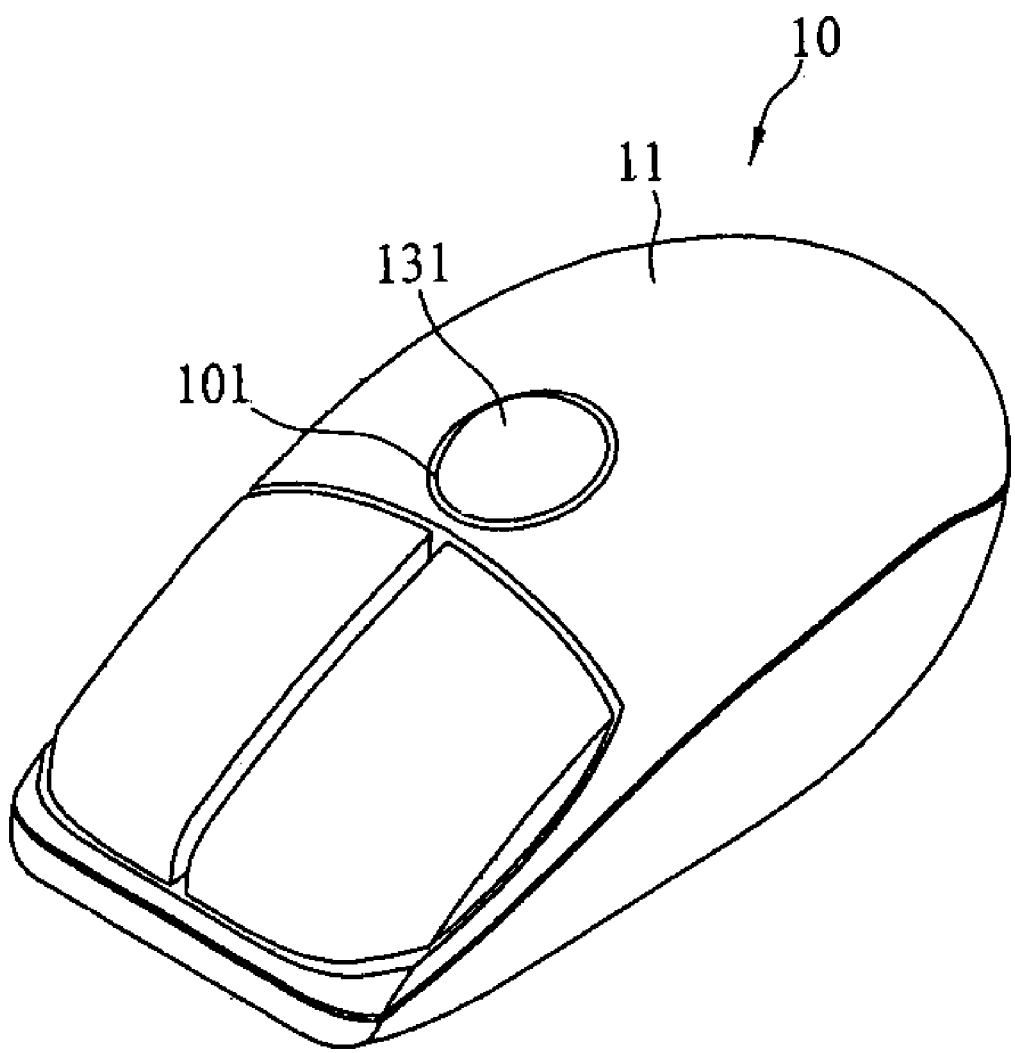
FIG. 1 is a perspective view of the present invention.
Figure 2:
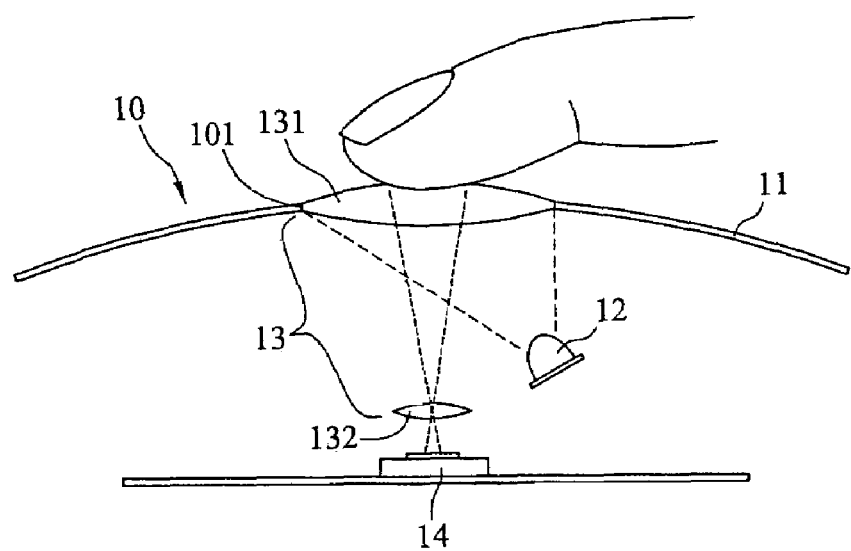
FIG. 2 is a simplified diagram showing the main structure according the present invention, in which a finger is in contact with a lens.

Referring to FIGS. 1 and 2, the pointing device can be a computer mouse 10, which includes lens system 13. Lens system 13 may include a first convex lens 131 located upon the housing 11 of the mouse 10, and a second convex lens 132 positioned within the housing 11, between the first convex lens 131 and a sensor 14. Referring to FIG. 2, the mouse 10 further comprises a light source 12, and an opening 101 on the housing 11 for accommodating the first convex lens 131. The light source 12 projects a light beam over the first convex lens 131 such that the light beam evenly illuminates the entire surface of the first convex lens and is reflected when a finger or other object is placed upon the lens 131. Then, the reflected light beam is focused on the sensor 14 by the second lens 132. As a result, the sensor 14 is capable of clearly retrieving an image showing the finger position. If the finger starts sliding on the lens 131, the sensor 14 will compare the next image to determine a corresponding cursor-moving signal for transmission to a computer system through a wired or wireless interface (not shown).

Figure 3:
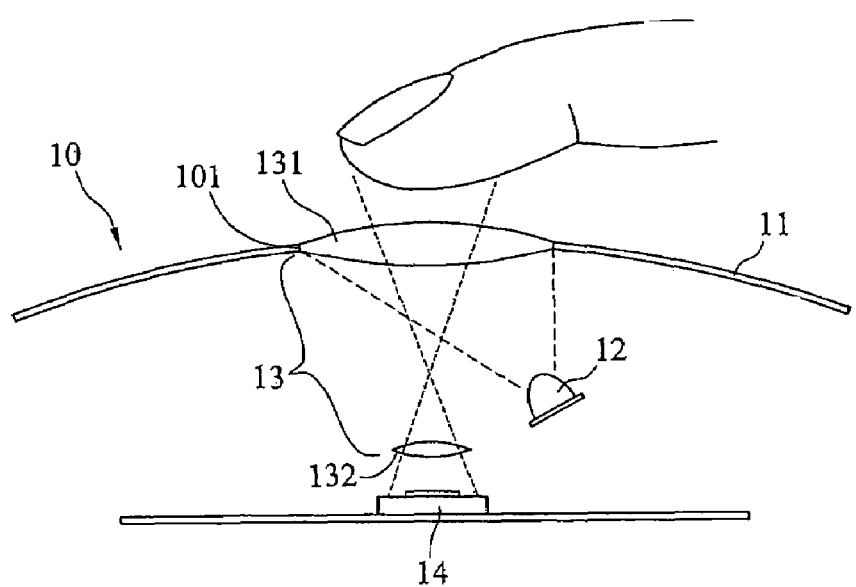
FIG. 3 is a simplified diagram in which the finger of FIG. 2 is away from the lens.

Referring to FIG. 3, once the finger is away from the lens 131, the image of the finger will be obscured because the reflected light will not be focused on the sensor 14 by the second lens 132. Thus, the sensor 14 will not generate any cursor-moving signal for transmission to the computer system.

Due to the character of the first convex lens 131, the finger has to contact the lens 131 properly so as to present a clear image for the sensor 14. In other words, even if the finger is very close to the lens 131, the sensor 14 will not sense any vague image to generate a signal for the computer.

Figure 4:
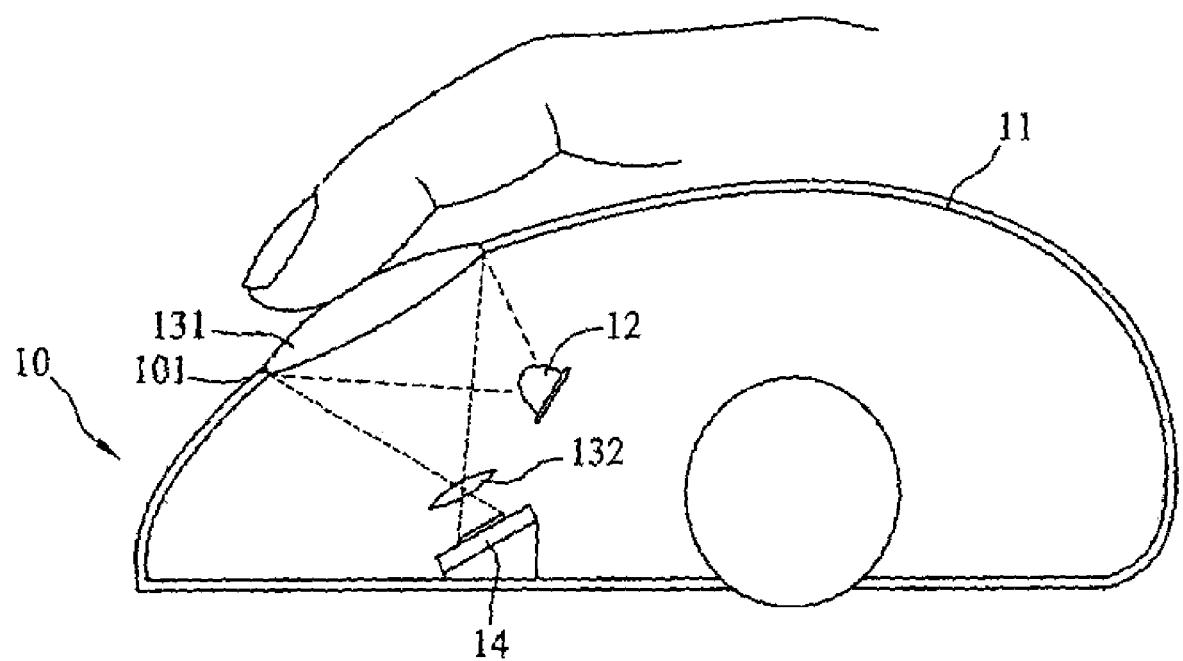
FIG. 4 is a second embodiment showing an implementation arranged to function as a screen-scrolling (Z-axis scrolling) pointing device.

Referring to FIG. 4, U.S. Pat. No. 5,530,455 discloses a roller mouse that can be used to scroll the content of a computer screen in a windows application program so as to enable the user to read a non-displayed portion of the content. The present invention provides a new way to replace the roller located upon the front of the mouse so that once a user moves his finger back and forth, a scrolling signal will be generated to scroll the content on the computer display. This is accomplished by replacing the scroll wheel with a light source 12, first convex lens 131, and second convex lens 131 which function in the same manner as the corresponding elements of the embodiment of FIGS. 1-3, but which replace the scroll wheel rather than the roller ball of the mouse.

It will be appreciated by those skilled in the art that although the illustrated convex lenses are biconvex lenses, at least the first convex lens 131 may be either a biconvex or a single convex lens, although the biconvex lens can obtain a better image.

By the way, the present invention not only applies to a pointing device, but also can be built-in to a computer system, such as a notebook computer, a PDA or the like.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A pointing device, comprising
   a housing;
   a first convex lens located upon the housing such that an object may be placed on the first convex lens, said first convex lens having two convex surfaces;
   a light source within the housing arranged to project light on the first convex lens;
   a sensor located within the housing for sensing light reflected from the object when the object is placed on the first convex lens;
   a second convex lens located between the first convex lens and the sensor for focusing light reflected from the object onto the sensor;
   wherein said first convex lens and said second convex lens are arranged such that when an object contacts the first convex lens, light projected by the light source and reflected by the object is clearly focused on and detected by the sensor through the second convex lens; and
   wherein when the object slides over the first convex lens, the sensor detects a new image position so as to generate a corresponding electronic signal for transmission to a computer system.

2. The pointing device as claimed in claim 1, wherein the electronic signal is arranged to move a computer cursor, or scroll a content on a computer display.

3. The pointing device as claimed in claim 1, wherein the light beam evenly illuminates an entire surface of the first convex lens.

4. The pointing device as claimed in claim 1, wherein the pointing device is built-in to a housing of a computer.

5. The pointing device as claimed in claim 1, wherein the first convex lens is located upon the top of the housing.

6. The pointing device as claimed in claim 1, wherein the first convex lens is located in a front end of the housing.

7. The pointing device as claimed in claim 1, wherein the first convex lens is located upon a lateral side of the housing.

* * * * *